United States Patent
Zabler et al.

[11] Patent Number: 5,930,905
[45] Date of Patent: Aug. 3, 1999

[54] METHOD AND DEVICE FOR ANGULAR MEASUREMENT OF A ROTATABLE BODY

[75] Inventors: Erich Zabler, Stutensee; Klaus Marx; Franz Jost, both of Stuttgart; Manfred Abendroth, Marbach; Hans Braun, Stuttgart, all of Germany

[73] Assignee: Robert Bosch GmbH, Stuttgart, Germany

[21] Appl. No.: 08/894,453

[22] PCT Filed: Jan. 31, 1996

[86] PCT No.: PCT/DE96/00132

§ 371 Date: Jul. 25, 1997

§ 102(e) Date: Jul. 25, 1997

[87] PCT Pub. No.: WO96/27116

PCT Pub. Date: Sep. 6, 1996

[30] Foreign Application Priority Data

Feb. 28, 1995 [DE] Germany .............................. 195 06 938

[51] Int. Cl.$^6$ ...................................................... G01B 7/00
[52] U.S. Cl. ............................................................ 33/1 PT
[58] Field of Search .................................. 33/1 PT, 1 N, 33/534, 501.7

[56] References Cited

U.S. PATENT DOCUMENTS

| | | | |
|---|---|---|---|
| 2,623,936 | 12/1952 | Kennedy et al. | 33/1 PT |
| 3,077,671 | 2/1963 | Lindholm et al. | 33/501.7 |
| 4,072,893 | 2/1978 | Huwyler | 33/1 PT |
| 4,660,288 | 4/1987 | Dangschat | 33/1 PT |

FOREIGN PATENT DOCUMENTS

| | | | |
|---|---|---|---|
| 2697801 | 11/1992 | France . | |
| 2436126 | 2/1975 | Germany | 33/1 PT |
| P 4409892 | 3/1994 | Germany . | |
| WO 86/00415 | 1/1986 | WIPO | 33/1 PT |

*Primary Examiner*—G. Bradley Bennett
*Attorney, Agent, or Firm*—Michael J. Striker

[57] ABSTRACT

A method and a device for measuring the angle of a rotatable body, in particular a body rotatable by more than 360°, are described. In this case this rotatable body cooperates with at least two further rotatable bodies, for example gear wheels, whose angular positions are determined with the aid of two sensors. The angular position of the rotatable body is determined from the angular positions detected in this way. So that unequivocal statements can be made, it is necessary for all three rotatable bodies or gear wheels to have defined predetermined numbers of teeth. The method and the device can be used, for example, for determining the steering angle of a motor vehicle.

8 Claims, 3 Drawing Sheets

# METHOD AND DEVICE FOR ANGULAR MEASUREMENT OF A ROTATABLE BODY

BACKGROUND OF THE INVENTION

The invention relates to a method and a device for measuring the angle of a rotatable body, in particular of a body rotatable by 360°.

In connection with various applications, in particular with arrangements with the aid of which the angular position of a rotatable shaft is to be determined, there is a desire to know the exact position of the shaft immediately following start-up of the arrangement. This requirement can be best met with the aid of analog angle sensors, for example potentiometers, which provide the valid angular position in the form of a voltage in every position following start-up.

When such arrangements for angular measuring are employed for angular ranges which are greater than 360°, the problem arises that it can no longer be determined in which revolution the shaft is. However, incremental sensors can be used for evaluating angular ranges which are greater than 360°, in which the angular position is determined by forward or backward counting of pulses. However, it is not possible to perform an absolute angle measurement with such incremental sensors, because it is only possible to count increments which move past a counter.

So that an angular measurement of angular ranges larger than 360° is possible, it is proposed in not yet published German patent application DE-P 44 09 892 in connection with the detection of a steering angle of a motor vehicle, to perform the determination of the steering wheel angle, which extends over a range of ±720°, with the aid of a planetary gear system. In this case the number of teeth of the planetary gear system is dimensioned in such a way that a value of exactly 4 results for the gear ratio between the steering axle and the pick-up disk to be scanned. The pick-up disk to be scanned therefore only rotates once while the steering angle is changed by ±720°. By means of applying a code to the pick-up disk and scanning it with a suitable sensor it is possible to determine the position of the pick-up disk immediately following start-up, and a steering wheel angle determination is also immediately possible with this.

This known arrangement for the angular measurement of angular ranges greater than 360° has the disadvantage that an exactly dimensioned planetary gear system is necessary and that in addition an elaborate absolute sensor system is required.

SUMMARY OF THE INVENTION

In contrast thereto, the method in accordance with the invention and the device in accordance with the invention for angle measurement in connection with a rotatable body, in particular a body rotatable over more than 360°, has the advantage that a quite general absolute angle measurement is possible even over several revolutions without an elaborate planetary gear being required. Measurement errors are reduced by the use of two sensors, which detect two different angles. The measuring principle can be used in connection with all types of angle sensors, such as optical, magnetic, capacitive, inductive, resistive sensors, i.e. arbitrarily with contact and contact-free sensors.

These advantages are achieved in that the shaft, whose angular position is to be determined, is provided with a gear wheel or a gear rim which cooperates with two further gear wheels, whose angular position is continuously detected with the aid of a sensor each, and in that the angle to be determined is calculated in a suitable manner from the two measured angles.

It is particularly advantageous that the angular range and the angular exactness can be freely set by the appropriate selection of the number of the angular markers or teeth of the individual gear teeth or gear rims. The arrangement of the gear wheels can be selected to be such that desired advantages are created. In this case the gear wheels can be arranged in a single plane or in different planes.

Further advantages of the invention are achieved by means of the steps recited in the dependent claims. It is particularly advantageous in this connection that too large measuring errors and the failure of one individual sensor can be detected. By comparison with the latest values it is possible to determine, which sensor is possibly defective, and in an advantageous manner an emergency operation with only a single sensor is possible. When using an 8-bit analog/digital converter, a theoretical resolution of less than 0.1° of the steering angle can be achieved by means of a steering angle sensor operating in accordance with the principle of the invention.

BRIEF DESCRIPTION OF THE DRAWINGS

Exemplary embodiments of the invention are represented in the drawings and will be explained in more detail in the following description. In particular, FIG. 2 represents an exemplary embodiment of a steering angle sensor, wherein

DESCRIPTION OF PREFERRED EMBODIMENTS

Figure 1:
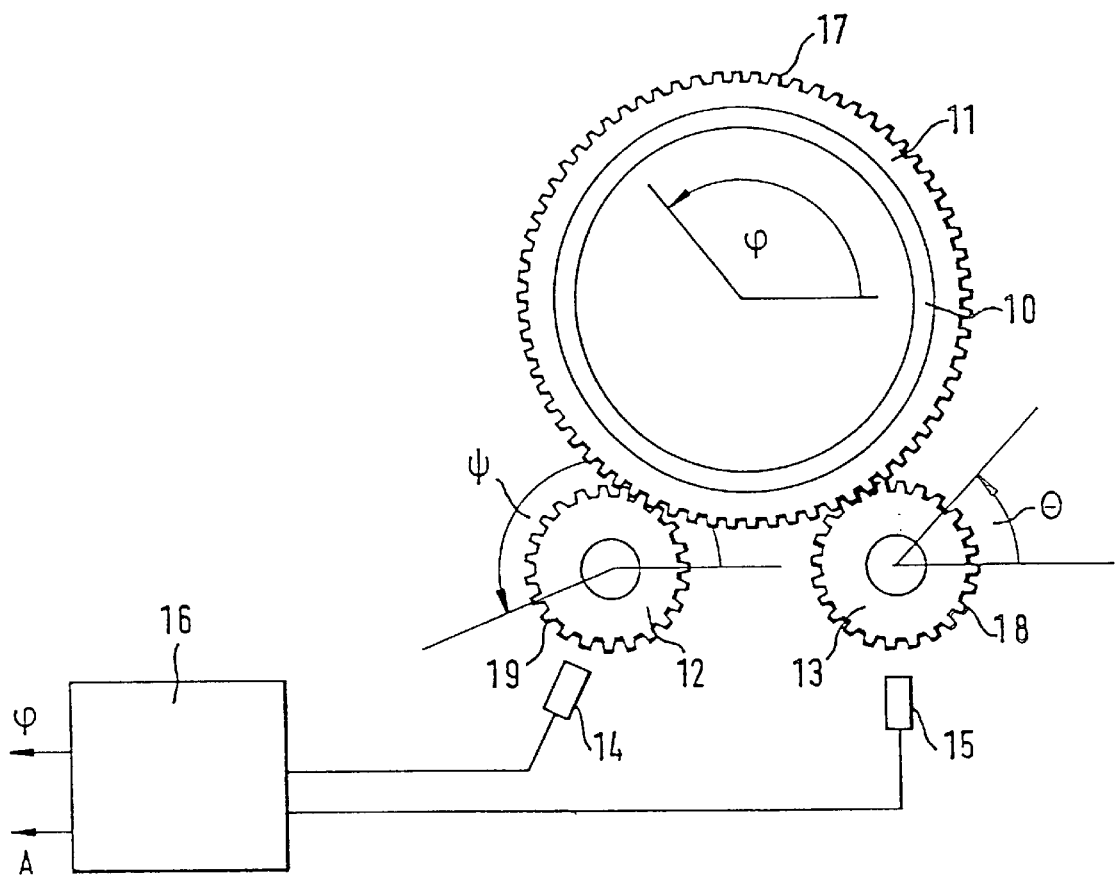
FIG. 1 represents a first arrangement, by means of which the angle of a shaft which is rotatable over more than 360° can be detected.

In FIG. 1, 10 identifies an axle or a rotatable body, whose angle of rotation $\phi$ is to be measured. A gear wheel 11 which has n teeth has been attached to this axle 10. Two further gear wheels 12 and 13, which have m and m+1 teeth, are coupled, fixed in place, with the gear wheel 11. The angles $\psi$ and $\theta$ of these two gear wheels are measured with the aid of two periodic angle sensors 14, 15. This measurement can be performed by contact or contact free. The periodicity of these angle sensors will be identified by $\Omega$. Usually $\Omega=180°$ or $=360°$, however, other angle values are also possible.

The angle sensors are connected with an electronic evaluation circuit 16, in which the calculations required for determining the axle angle $\phi$ are performed.

Provided that the angle sensors 14, 15 are so-called absolute sensors, they will provide the angles of rotation psi and $\theta$ of the gear wheels 12 and 13 existing at start-up as soon as the device for detecting the angular position of the shaft 10 has been switched on. It is immediately possible to definitely determine the angle $\phi$ of the shaft 10, as long as the number of the angular markers or teeth 17 of the gear wheel 11 and the number of the angular markers or teeth 18, 19 of the gear wheels 13, 12, is known.

Figure 3:
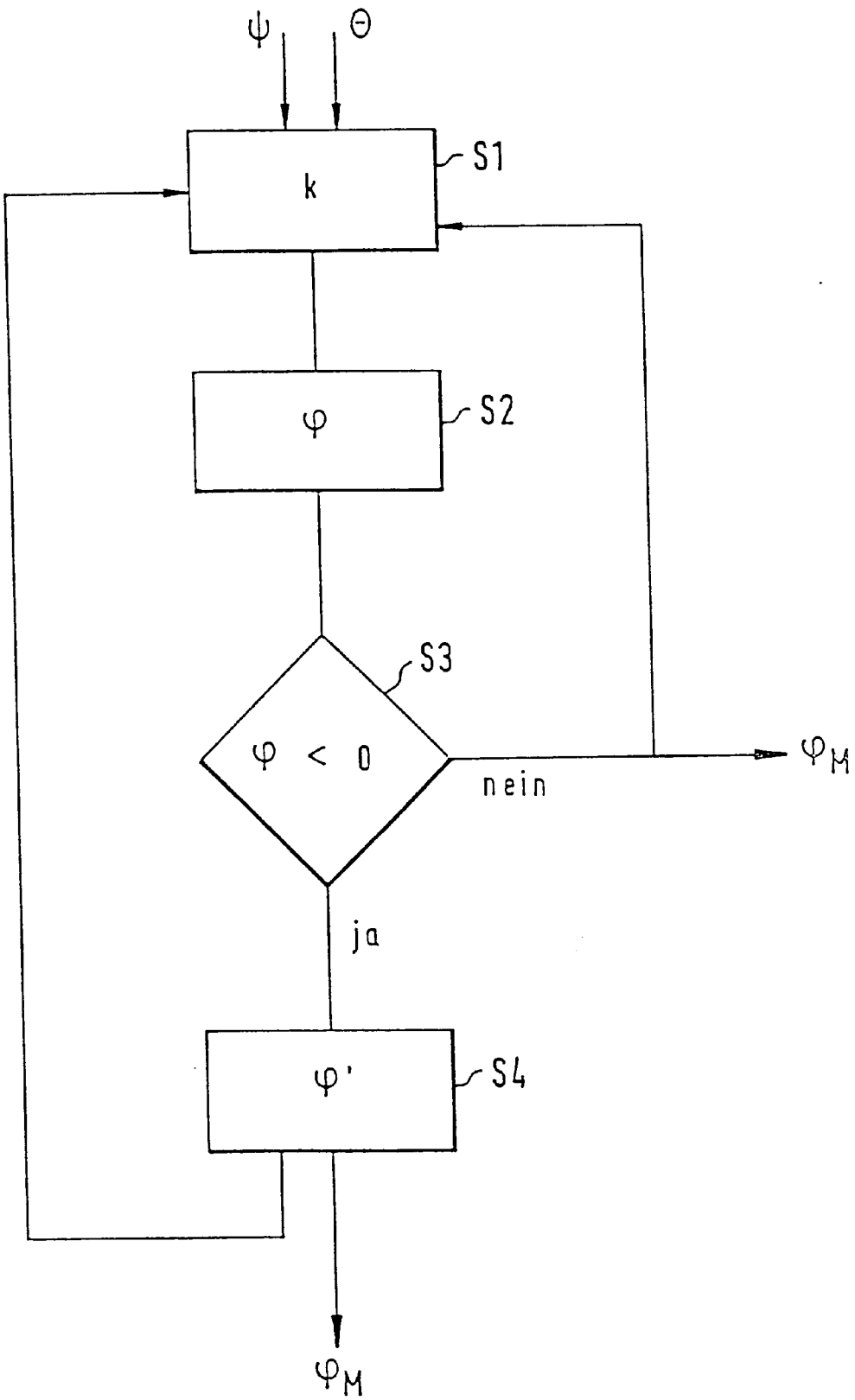

The number of the teeth 17, 18, 19 of the individual gear wheels should be selected as a function of how large the angle $\phi$, which is to be detected, can be. For an angle detection range of $\phi=360°$ and a measurement range $\Omega$ of the two angle sensors 14, 15 of 360° and a required accuracy of 1°, the number of the teeth 11 must be n=87, the number of the teeth m then must =29. The angle range of 3600° can be represented with such gear wheels in such a way that definite assignments are possible for the angles θ and psi within this angular range. After switch-on of the device in accordance with the invention, the calculation of the angle of rotation φ takes place in accordance with a method such as can be taken from FIG. 3, for example: in a first step S1, the next whole number of the expression $$k = \frac{(m+1)\cdot\theta - m\cdot\psi}{\Omega} \tag{1}$$

is calculated in the evaluation circuit 16, wherein the angles θ and psi had been previously measured. In step S2, the angle φ is then calculated, wherein the following applies:

$$\varphi = \frac{m\cdot\psi + (m+1)\cdot\theta - (2m+1)\cdot k\cdot\Omega}{2n} \tag{2}$$

A check is made in step S3, whether the previously detected angle φ is negative. If this is the case, the full angle period is added in step S4, the following applies:

$$\varphi' = \varphi + \frac{m\cdot(m+1)}{n}\cdot\Omega \tag{3}$$

The angle $\varphi^1$ obtained in this manner is then taken over as the actual measure value φM. But if it is detected in step S3 that φ is not less than 0, the angle determined in step S2 is issued as the measured angle φM.

After the measured valued φM has been issued, the next angle determination starts from the next angles θ and ψ measured in step S1.

The measuring error Epsilon of the individual angle sensors 14, 15 is transferred in accordance with equation (2) at a ratio m/n to the error of the angle φ, so that the measurement accuracy can be set by means of the appropriate selection of the transfer ratio m/n. However, if the measurement error of the individual sensors becomes so great that an erroneous whole number k is calculated after rounding off in accordance with the equation (1), the detected angle φ does not change continuously, but suddenly, by the amount:

$$\Delta\varphi = \pm\frac{2m+1}{2n}\cdot\Omega \tag{4}$$

This can be intercepted in that the change of the value for k in accordance with the formula (1) is followed. With a continuous change of ψ and/or θ via Ω to 0 and vice versa, the value k can only assume whole number changes of ±m and ±(m+1). If a different jump is registered, this is an indication of too large a measurement error or a defective individual sensor. It is therefore possible to compare the successive values for k determined by the method in accordance with FIG. 3 in step S1, and an error can be detected in case of implausible changes. In that case an error indication A can be issued by the evaluation circuit 16.

So that the correct value for k is obtained, the angular error of the individual sensors 14, 15 must be less than $$\delta = \pm\frac{0,5\cdot\Omega}{2m+1} \tag{5}$$

from which the maximum angular error for the angle φ results as follows:

$$\delta\varphi = \frac{m\cdot\Omega}{2n\cdot(2m+1)} \tag{6}$$

Larger angular errors of the individual sensors lead to a jump φ, which can be detected by means of an impermissible change of k.

The capability of calculating the angle of rotation φ from the two angles ψ and θ can be explained by the following:

Based on the number of teeth, the connection between the angle φ and the two angles ψ and θ applies $$\psi = \frac{n}{m}\cdot\varphi\bmod\Omega \quad (\text{mod = modulo}) \tag{7}$$

$$\theta = \frac{n}{m+1}\cdot\varphi\bmod\Omega \tag{8}$$

Since both angles are repeated after the angle Ω, only the remainder needs to be used in the division by Ω.

The reversion of (7) and (8) is:

$$\varphi = \frac{m}{n}\cdot(\psi + i\cdot\Omega) \tag{9}$$

or $$\varphi = \frac{m+1}{n}\cdot(\theta + j\cdot\Omega) \tag{10}$$

i and j are whole numbers, which are initially unknown since, for example with an angle ψ between 0° and Ω, it is not known how often ψ has turned over Ω.

But since (9) and (10) must provide the same angle psi, (9)=(10) applies, which leads to the relationship $$m\cdot i - (m+1)\cdot j = \frac{(m+1)\cdot\theta - m\cdot\psi}{\Omega} \tag{11}$$

The left side of (11) is a whole number, therefore the right side also must be a whole number:

$$k = \frac{(m+1)\cdot\theta - m\cdot\psi}{\Omega} \tag{12}$$

Since the angles θ and ψ contain errors (principal and statistical measuring error, digitalization), as a rule (12) will not be a whole number. However, if the next whole number of this expression is selected, the errors in the angles are very greatly reduced.

Then the equation (11) is $$m\cdot i - (m+1)\cdot j = k \tag{13}$$

This is an equation for two unknowns i and j, but since i and j must be whole numbers, (13) has discrete solutions (so-called diophantine problem). The only solution required for evaluation is easily found:

$$i = j = -k \tag{14}$$

It is possible with these values to calculate φ as the mean value of (9) and (10) (possible measurement errors are again reduced by this).

$$\varphi = \frac{m \cdot \psi + (m+1) \cdot \theta - (2m+1) \cdot k \cdot \Omega}{2n} \qquad (15)$$

φ calculated in this way can assume positive as well as negative values. To obtain a continuous representation, in case of negative values the full period of the entire system must be added:

$$\varphi' = \varphi + \frac{m \cdot (m+1)}{n} \cdot \Omega \qquad (16)$$

Figure 2A:
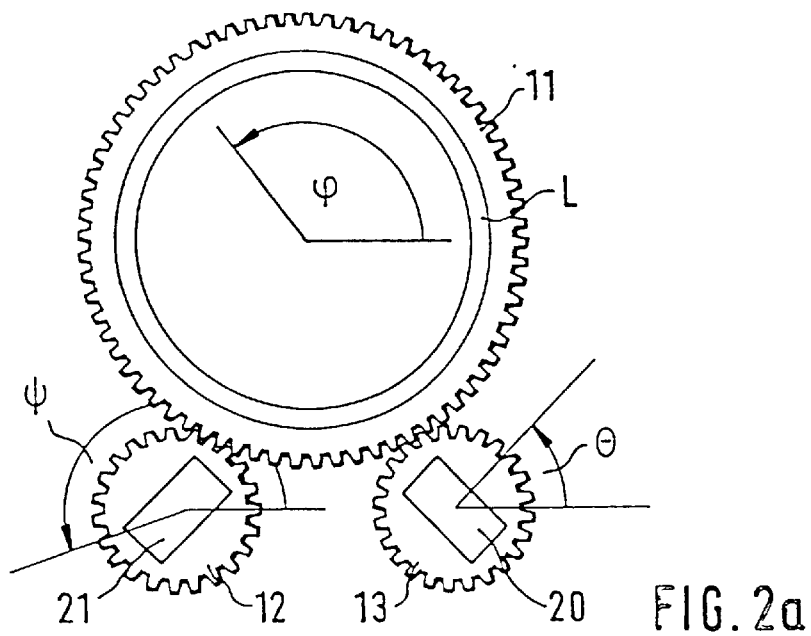
FIG. 2a represents the arrangement of the gear wheels in a top view.
Figure 2B:
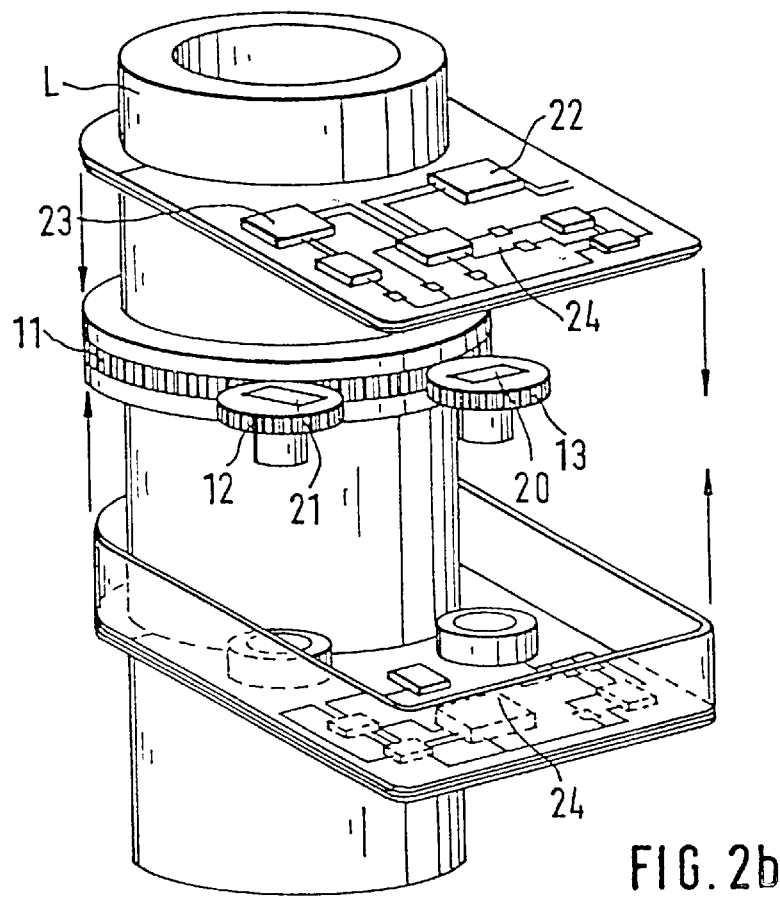
FIG. 2b represents the entire arrangement for detecting the steering angle, including the associated sensors and the evaluation circuit. A flow diagram of a method in accordance with the invention is represented in FIG. 3.

A device in accordance with the invention for measuring the angle of the steering angle L of a motor vehicle is represented in FIGS. 2a and 2b. As contactless as possible a sensor is needed for this purpose, which can maximally detect four steering wheel turns or revolutions of the steering axle.

The steering axle L, whose angle φ is to be determined, corresponds to the shaft identified by 10 in FIG. 1. The relationships in accordance with FIG. 1 apply to the gear wheels as well as the inserted angles θ and ψ. In addition, there are magnets 20 and 21 on the gear wheels 18 and 19, whose magnetization lies in the plane of the gear wheels. The angles psi and φ are measured with the aid of two angle sensors 22, 23, which are identified as AMR (anisotropic magneto-resistive) sensors, which correspond to the sensors 14, 15 in FIG. 1. An example for the construction of a steering angle sensor can be found in FIG. 2b. In this example the three gear wheels 11, 12, 13 are located in one plane. The magnets 21, 20 are arranged on the gear wheels 12 and 13, with the aid of these magnets as well as the two AMR angle sensors 22, 23 the angles θ and ψ can be absolutely detected. The evaluation circuit which processes the output signals of the AMR sensors, is represented as the hybrid circuit 24. The determination of the angles ψ and φ takes place by detecting the magnetic field paths caused by the magnets 20, 21.

It is possible to employ other angle sensors in place of the AMR sensors, for example angle sensors on the basis of Hall sensors, optical sensors, inductive, capacitive or resistive sensors. Depending on the type of sensor employed, it is necessary to adapt the gear wheels in a suitable manner. It is also possible to use code disks, to which suitable code systems have been applied, instead of gear wheels.

So that the angle detection required in connection with steering angles is possible over four full turns, it is possible to select n=69 and m=23, this then results in a total period of 1440°, i.e. exactly four turns.

We claim:

1. A method for measuring the angle of a rotatable body, in particular a body which can be rotated by more than 360°, which has a number of uniform angular markers or teeth and cooperates with at least two further rotatable bodies, which have another number of uniform angular markers or teeth, characterized in that the angles θ and ψ of the two further rotatable bodies are determined and the angular position φ of the rotatable body whose angle is to be measured is calculated from the angles θ and ψ, taking into consideration the prevailing geometric conditions.

2. The method in accordance with claim 1, characterized in that in a first step the whole number k is determined by forming the difference between the number of the teeth M of the gear wheel (12), multiplied by the angle θ, and the number of the teeth MH of the gear wheel (13), multiplied by the angle ψ, and this number is divided by the angle Ω, and in a second step the angle φ, which is to be detected, is determined starting from this k-value by evaluating the equation $$\varphi = \frac{m \cdot \psi + (m+1) \cdot \theta - (2m+1) \cdot k \cdot \Omega}{2n} \qquad (2)$$

and, in case of a negative angle φ, subsequently the full angle period is added to this.

3. The method in accordance with claim 2, characterized in that the number k is monitored for plausible changes, and an error is detected in case of implausible changes of k.

4. A device for detecting the angular position by means of a method in accordance with claim 1 characterized in that the rotating bodies are gear wheels, and the number of teeth of a first gear wheel is n, that of a second gear wheel is m, and that of a third gear wheel is m+1, wherein the numbers n and m are different, that the angles θ and ψ are detected by means of sensors (14, 15), and the angle ψ is determined in an evaluating circuit (16).

5. The device in accordance with claim 4, characterized in that the angles θ and ψ are detected by means of one sensor each, which operates as an absolute value sensor.

6. The device in accordance with claim 4, characterized in that the angle to be determined is the steering angle of a motor vehicle, and that the first gear wheel is connected with the steering axle and rotates along with it.

7. The device in accordance with claim 5, characterized in that the sensors which detect the angular position of the second and third gear wheels are AMR angle sensors, which scan magnets connected with the gear wheels.

8. The device in accordance with claim 6, characterized in that the determination of the angle φ from the angles θ and ψ is performed with the aid of an evaluation circuit which is designed as a hybrid circuit, wherein the two AMR angle sensors are components of this hybrid circuit.

* * * * *

(12) EX PARTE REEXAMINATION CERTIFICATE (5958th)
United States Patent
Zabler et al.

(10) Number: US 5,930,905 C1
(45) Certificate Issued: Oct. 23, 2007

(54) METHOD AND DEVICE FOR ANGULAR MEASUREMENT OF A ROTATABLE BODY

(75) Inventors: Erich Zabler, Stutensee (DE); Klaus Marx, Stuttgart (DE); Franz Jost, Stuttgart (DE); Manfred Abendroth, Marbach (DE); Hans Braun, Stuttgart (DE)

(73) Assignee: Robert Bosch GmbH, Stuttgart (DE)

Reexamination Request:
No. 90/007,527, Apr. 28, 2005

Reexamination Certificate for:
Patent No.: 5,930,905
Issued: Aug. 3, 1999
Appl. No.: 08/894,453
Filed: Jul. 25, 1997

(22) PCT Filed: Jan. 31, 1996
(86) PCT No.: PCT/DE96/00132
  § 371 (c)(1),
  (2), (4) Date: Jul. 25, 1997
(87) PCT Pub. No.: WO96/27116
  PCT Pub. Date: Sep. 6, 1996

(30) Foreign Application Priority Data
Feb. 28, 1995 (DE) .......................... 195 06 938

(51) Int. Cl.
  *G01D 5/16* (2006.01)
  *G01D 5/245* (2006.01)
  *G01D 5/12* (2006.01)
  *G01D 5/04* (2006.01)
  *G01D 5/02* (2006.01)

(52) U.S. Cl. ........................................................ 33/1 PT
(58) Field of Classification Search ....................... None
See application file for complete search history.

(56) References Cited

U.S. PATENT DOCUMENTS 4,490,674 A  12/1984  Ito
5,930,905 A  8/1999  Zabler et al.

FOREIGN PATENT DOCUMENTS

FR  2 697 081   4/1994
JP  59-6806     12/1984

*Primary Examiner*—David O. Reip

(57) ABSTRACT

A method and a device for measuring the angle of a rotatable body, in particular a body rotatable by more than 360°, are decribed. In this case this rotatable body cooperates with at least two further rotatable bodies, for example gear wheels, whose angular positions are determined with the aid of two sensors. The angular position of the rotatable body is determined from the angular positions detected in this way. So that unequivocal statements can be made, it is necessary for all three rotatable bodies or gear wheels to have defined predetermined numbers of teeth. The method and the device can be used, for example, for determining the steering angle of a motor vehicle.

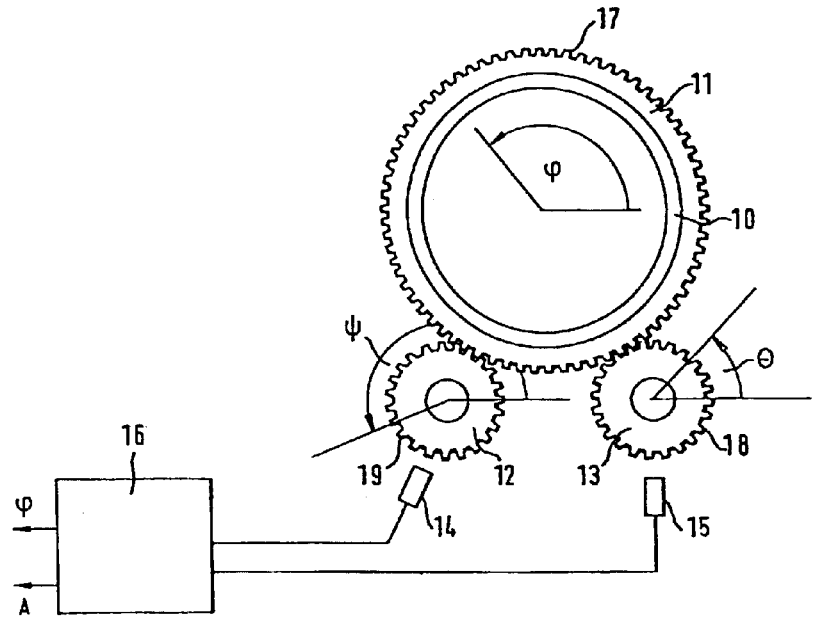

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 2 is cancelled.

Claims 1 and 3 are determined to be patentable as amended.

Claims 4–8, dependent on an amended claim, are determined to be patentable.

1. A method for measuring the angle of a rotatable body, in particular a body which can be rotated by more than 360°, which has a number of uniform angular markers or teeth and cooperates with at least two further rotatable bodies, which have another number of uniform angular markers or teeth, characterized in that the angles $\theta$ and $\psi$ of the two further rotatable bodies are determined and the angular position $\Phi$ of the rotatable body whose angle is to be measured is calculated from the angle $\theta$ and $\psi$, taking into consideration the prevailing geometric conditions, *wherein in a first step the whole number k is determined by forming the difference between the number of the teeth M of the gear wheel (12), multiplied by the angle $\theta$, and the number of the teeth MH of the gear wheel (13), multiplied by the angle $\psi$, and the number is divided by the angle $\Omega$, and in a second step the angle $\Phi$, which is to be detected, is determined starting from this k-value by evaluating the equation*

$$\varphi = \frac{m \cdot \psi + (m+1) \cdot \theta - (2m+1) \cdot k \cdot \Omega}{2n}$$

*and, in the case of a negative angle $\Phi$, subsequently the full angle period is added to this.*

3. The method in accordance with claim [2] *1*, characterized in that the number k is monitored for plausible changes, and an error is detected in case of implausible changes of k.

* * * * *